United States Patent [19]

Usui et al.

[11] Patent Number: 5,065,963
[45] Date of Patent: Nov. 19, 1991

[54] TRANSPORTING TRAIN TRAVEL CONTROL SYSTEM

[75] Inventors: Junichi Usui; Hideichi Tanizawa, both of Osaka, Japan

[73] Assignee: Daifuku Co., Ltd., Osaka, Japan

[21] Appl. No.: 394,762

[22] Filed: Aug. 16, 1989

[30] Foreign Application Priority Data

Sep. 1, 1988 [JP] Japan .................................. 63-219907
Sep. 1, 1988 [JP] Japan .................................. 63-219912
Jun. 12, 1989 [JP] Japan ................................. 1-68396[U]

[51] Int. Cl.$^5$ ............................ B61L 3/06; B61L 3/12
[52] U.S. Cl. ............................ 246/187 B; 246/187 A; 246/184
[58] Field of Search ............... 246/177, 178, 184, 186, 246/187 B, 187 A; 29/712

[56] References Cited

U.S. PATENT DOCUMENTS

| | | | |
|---|---|---|---|
| 2,554,906 | 5/1951 | Herbold | 246/177 |
| 3,072,785 | 1/1963 | Hailes | 246/187 A |
| 3,280,950 | 10/1966 | Magloire | 246/187 B X |
| 3,524,055 | 8/1970 | Smith | 246/184 X |
| 3,594,572 | 7/1971 | Horeczky | 246/187 B |
| 3,655,962 | 4/1972 | Koch | 246/187 B X |
| 3,731,088 | 5/1973 | Grundy et al. | 246/184 X |
| 3,735,352 | 5/1973 | Pease | 246/187 B X |
| 3,850,105 | 11/1974 | Aronstein et al. | 246/182 B X |
| 4,368,862 | 1/1983 | Grundy | 246/187 B X |
| 4,570,543 | 2/1986 | Ishikura et al. | 246/187 A X |
| 4,639,874 | 1/1987 | Pezaris | 246/187 B X |
| 4,788,498 | 11/1988 | Uemura | 246/187 B X |
| 4,922,830 | 5/1990 | Fujita et al. | 246/187 B X |

FOREIGN PATENT DOCUMENTS

| | | | |
|---|---|---|---|
| 2812115 | 9/1979 | Fed. Rep. of Germany | 246/187 A |
| 3046201 | 6/1982 | Fed. Rep. of Germany | 246/187 A |
| 769591 | 10/1980 | U.S.S.R. | 246/187 A |

Primary Examiner—Robert J. Spar
Assistant Examiner—Scott L. Lowe
Attorney, Agent, or Firm—Schweitzer Cornman & Gross

[57] ABSTRACT

A travel control system for trains, especially monorail trains, is disclosed. At each stopping point, there is a stop target mounted adajcent to the rail. The train carries a detector for sensing the stop targets and bringing the train to a stop at such targets. At each stop, there is also provided a controllable signal transmitter, cooperating with a receiver carried by the train. The transmitter/receiver combination has a greater effective transmitting range, in a lengthwise direction, than the stop target and its detector. Accordingly, the normal stop instructions can be overridden by activation of the controllable transmitter, allowing the train to pass through the stopping point without stopping. The controllable transmitter is also useful for restarting a train stopped in the normal course.

3 Claims, 9 Drawing Sheets

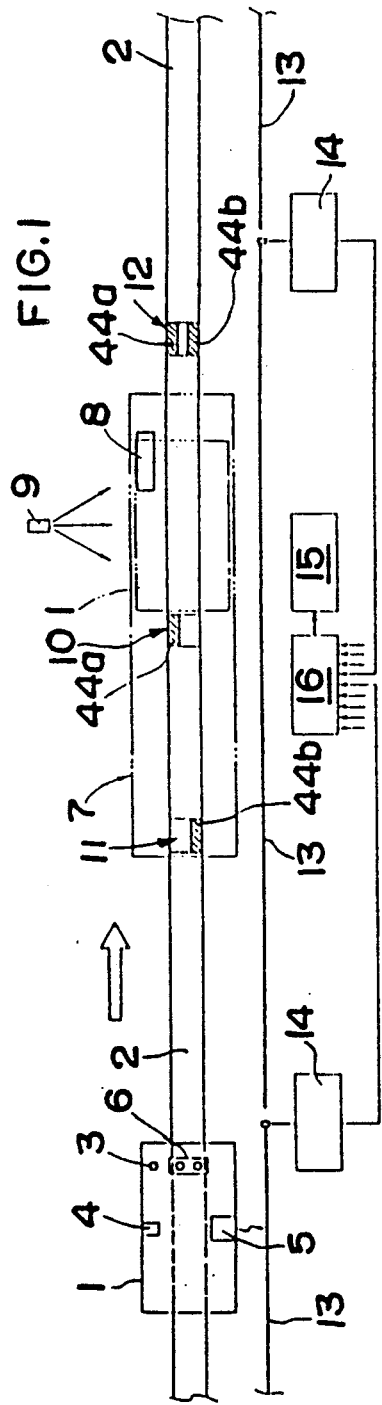
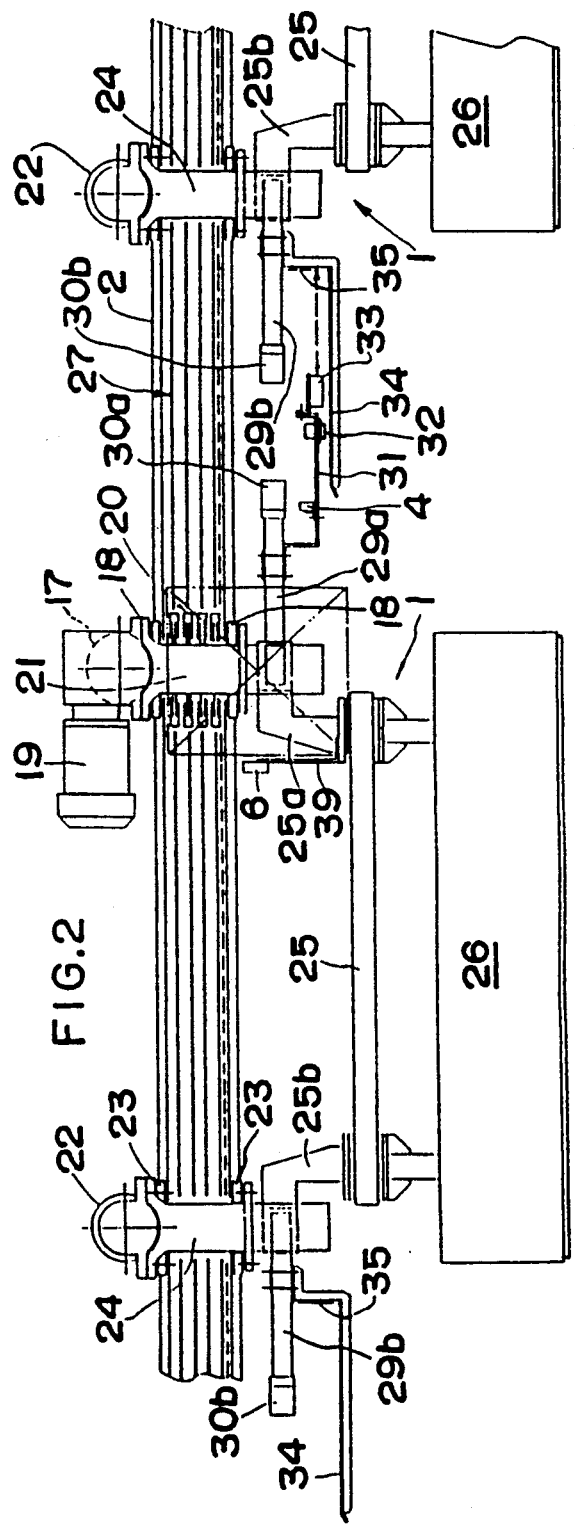
FIG.1
FIG.2

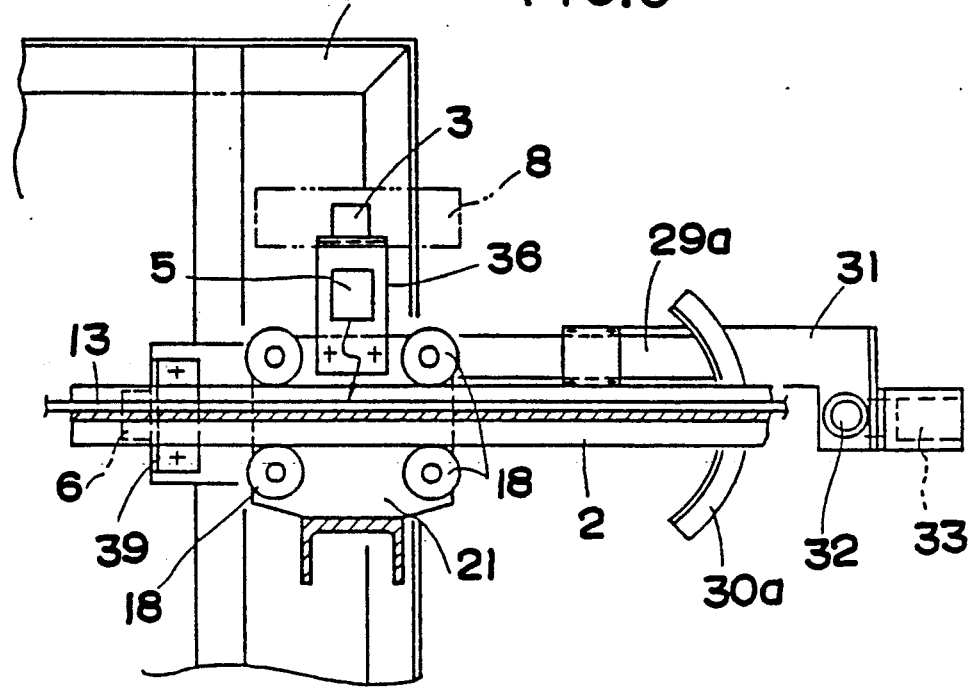
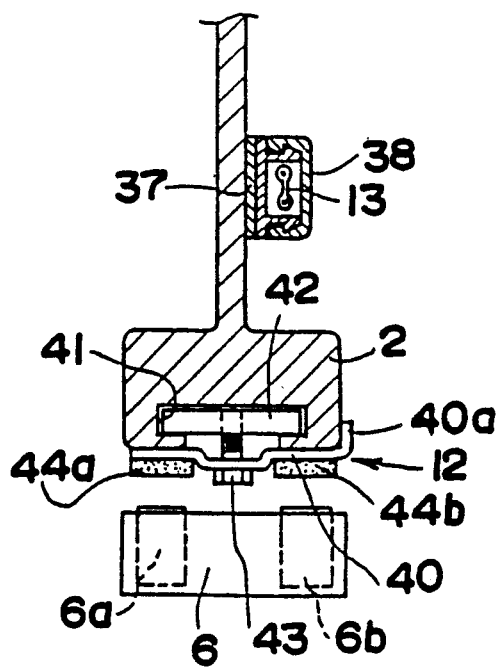
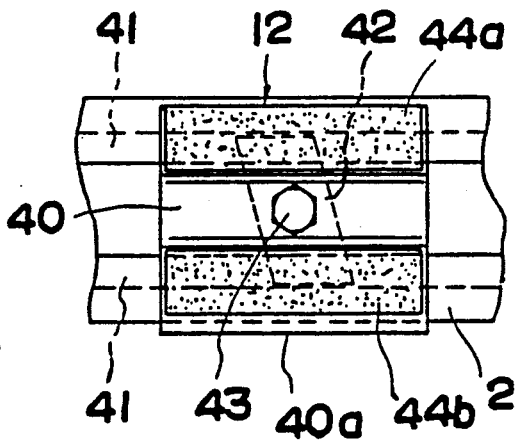

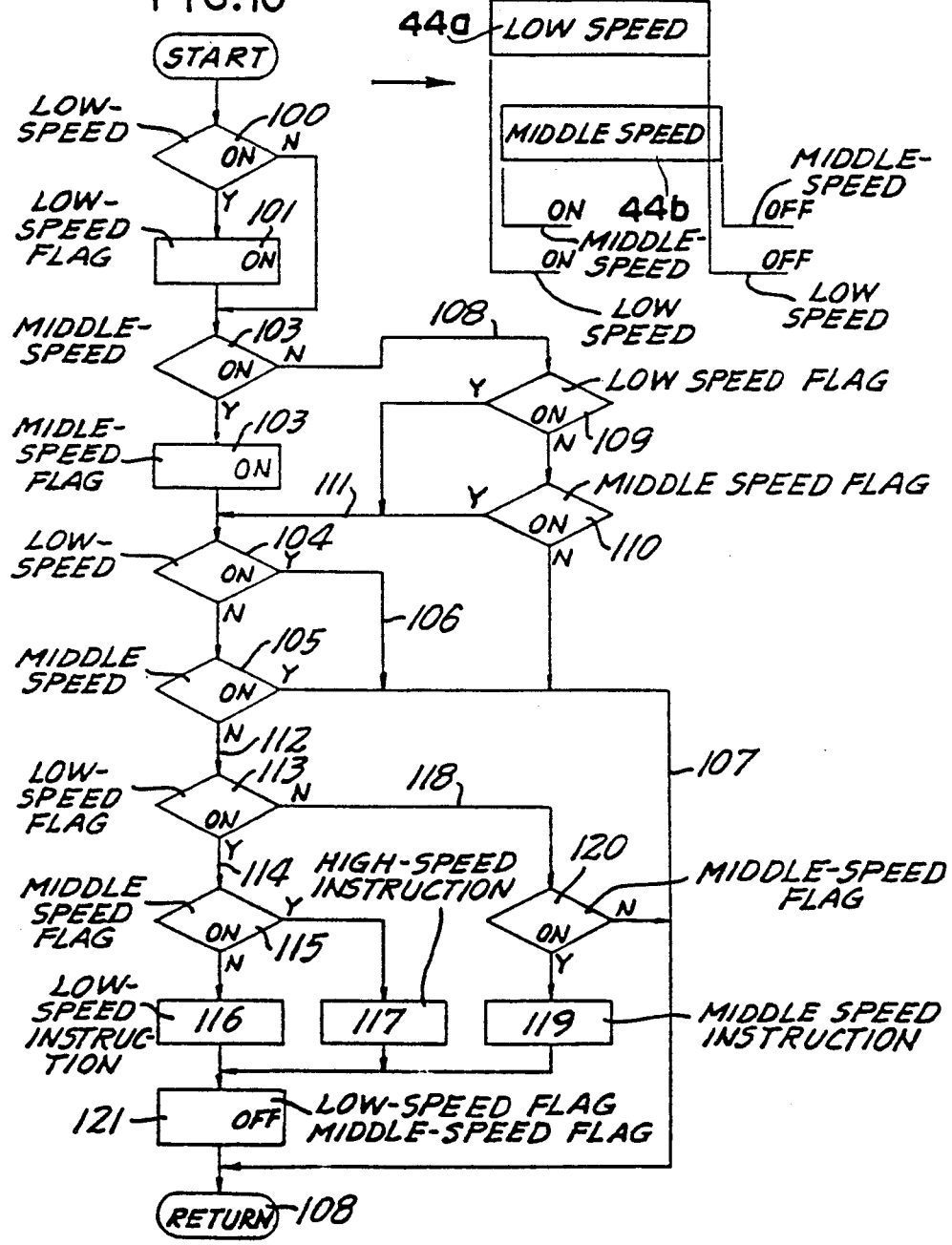

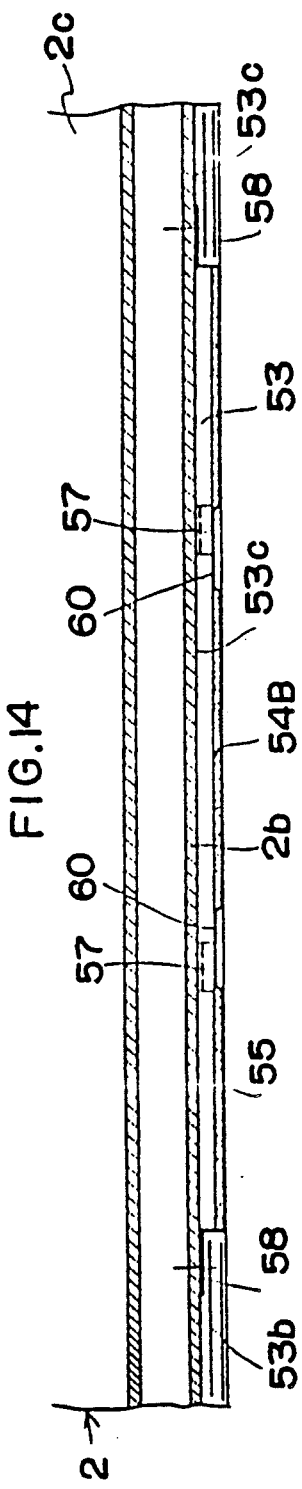
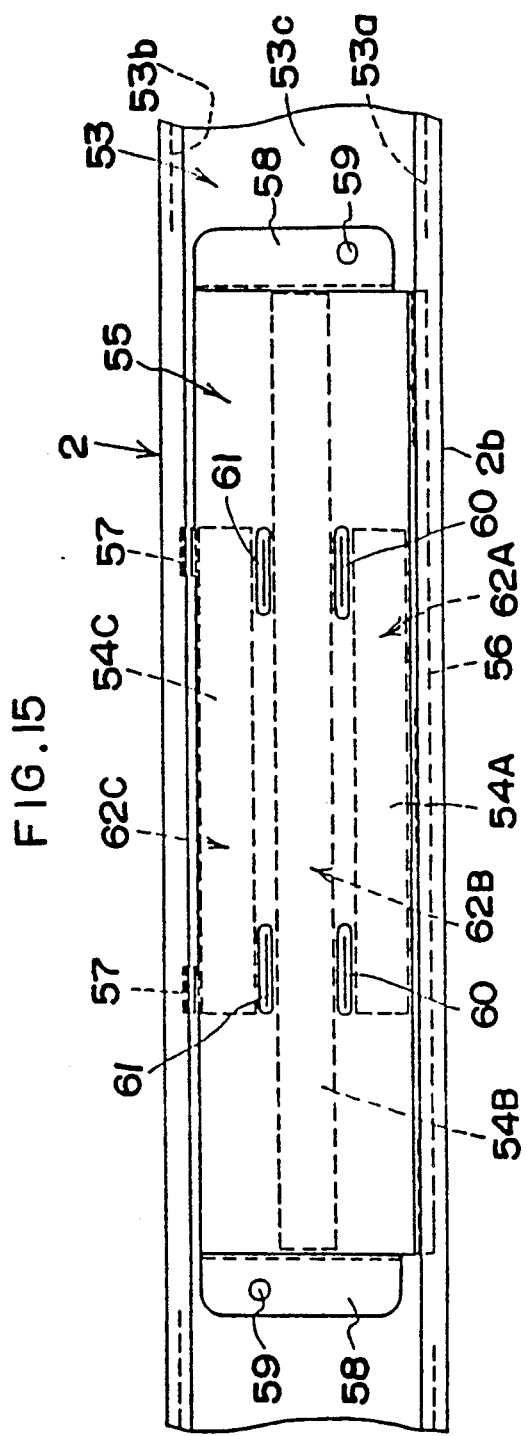

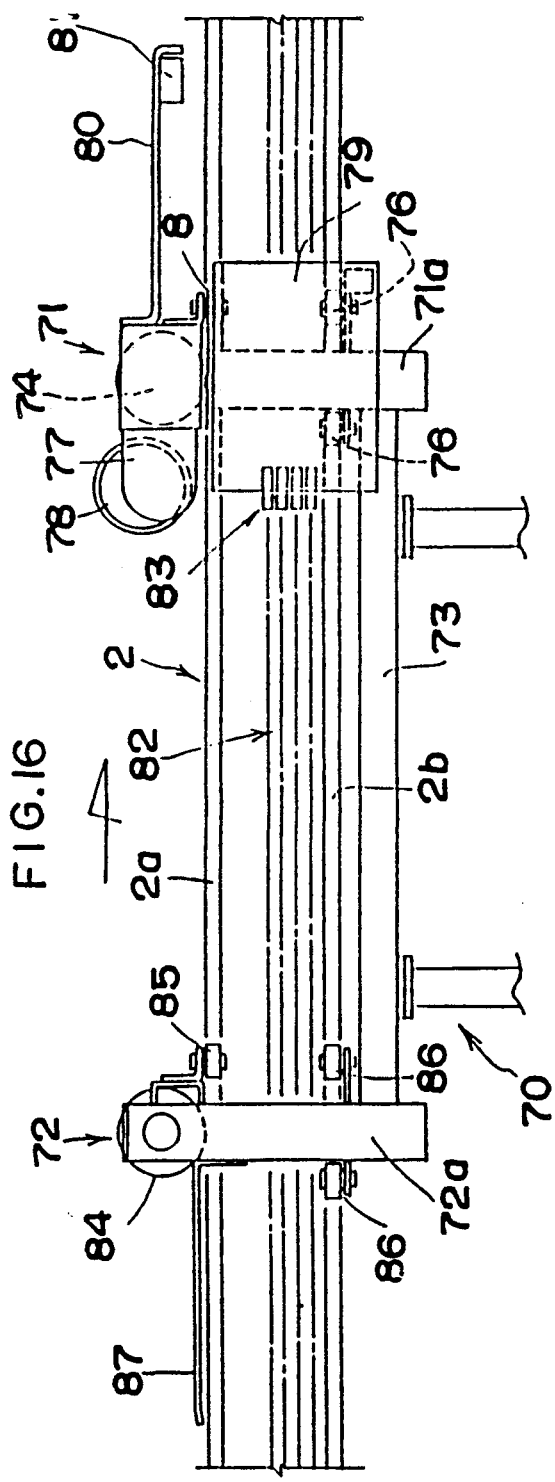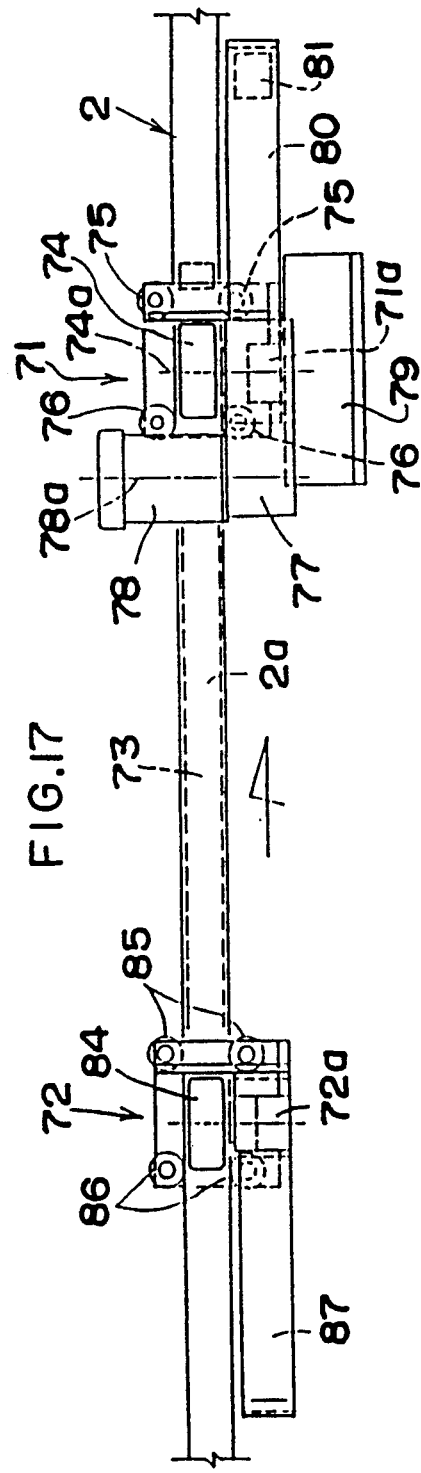

TRANSPORTING TRAIN TRAVEL CONTROL SYSTEM

BACKGROUND AND OBJECT OF THE INVENTION

This invention relates to a system which controls travelling of trains which are provided with driving wheels driven by a motor. Trains of this type are controlled in such a manner that the trains are stopped selectively at each station or before a junction or a joint arranged in the middle of the travelling rail. For this travel control, each stopping position has a target plate which can be switched between inactive and active positions. Each train has a 10 proximity switch for sensing a target plate, which is kept in an active position. Conventional systems have previously been composed so that each train is stopped when a target plate is sensed by the proximity switch, and each train at halt is started by switching the target plate to retracted or inactive position and by turning off the proximity switch.

A system of conventional composition, as described above, requires an actuator to switch the target plate between active and inactive positions as well as two limit switches for making sure that the target plate is properly switched to active or inactive positions respectively; this is expensive because of the number of parts involved. Moreover, the system can lead to an accident, since a train, which should be stopped, may go past without stopping should the target plate fail to return to its active position due to the actuator going out of order.

In view of the foregoing, a primary object of this invention is to provide a system to control travelling of trains which requires no actuators to switch positions of the target plate, yet can stop a running train at the position of the target plate, start a train at a halt, or even to keep a train running without stopping in some cases. For travel control of trains of this type, a code plate is mounted on the travelling rail of the trains. A code reading means is provided at the side of the trains, and travelling of the train is controlled on the basis of the information obtained from the code reading means.

In a travel control system of the conventional type, the code plate has a timing indicator apart from two or more parallel indicators which comprise travel control codes. The travel control codes are read in accordance with the ON/OFF state of other detectors, when the detector which reads the timing indicator is turned to an ON position. With a travel control system of conventional type, as described above, the code plate requires a timing indicator, which makes the code plate wider. Moreover, the detector required for reading the timing indicator, makes the number of parts involved larger. Accordingly, such a travel control system is disadvantageous in view of the cost.

Another object of this invention, therefore, is to provide a travel control system which can read control information of the code plate and accurately control travel of the train without using any timing indicator or detector.

For a control system which uses code plates as described above, the code plate is attached to the guide rails. Heretofore, the code plate has been fixed with bolts onto screw holes drilled at fixed positions on the guide rails or by using brackets which are welded to such fixed positions. With this construction, it is necessary to determine in advance the exact positions for attaching the code plates on the guide rails, and to accurately drill the holes or to attach the brackets. Following such procedures, it is rather difficult to attach the code plate precisely despite the care taken in attaching the code plate. Moreover, it normally is not possible to actually run a train car for trial, while temporarily fixing the code plate, in order to adjust the attaching position of the code plate according to the test result, and to fix the code plate after adjustment.

A further object of this invention, therefore, is to make it easy to attach the code plate accurately onto the guide rails. For trains which use a driving trolley of monorail type guided by one guide rail, the reduction gear placed between the motor and driving wheel has heretofore been arranged in parallel to said guide rail, at one side of the driving wheel, and the motor has been attached to the free end of the reduction gear so that the rotary axis is located on one side, oriented longitudinal direction which is parallel to the guide rail. With a transporting train of such conventional type, the center of gravity of the driving trolley is substantially offset from the center line of the guide rail, to the side of the reduction gear and motor, and comparatively large turning forces in the transverse direction are applied to said driving trolley. Accordingly, the anti-vibration rollers, positioned on the side of the reduction gear and motor become greatly worn out, which has been a cause of one-sided wear of the driving wheel. In addition, a costly, right angle, crossing-type gear transmission means, such as a worm gear, bevel gear, or hypoid gear, must be used for the reduction gear because the axis of the motor crosses at right angles with that of the propulsion wheel.

Still another object of this invention, therefore, is to avoid large lateral turning forces being applied to the driving trolley while eliminating the need for costly transmission gears between the motor and the driving wheel.

Other objects and advantages of the present invention will be clear from some preferred embodiments of this invention described below.

BRIEF DESCRIPTION OF THE DRAWING

FIG. 1 is a diagramatic block drawing to explain the overall configuration of a embodiment of this invention.

FIG. 2 is a side elevational view showing a specific composition of a monorail train incorporating the invention.

FIG. 4 and FIG. 5 are the top views in partial cross section of the system of FIG. 2.

FIG. 6 is an enlarged front view in longitudinal section of an important feature of the invention.

FIG. 7 is a bottom view of the equipment shown in FIG. 6.

FIG. 10 is a flowchart explaining the reading of the code plate.

FIG. 11 is a chart to describe positional deviation of the rubber magnet strips on the high-speed instruction code plate.

FIGS. 13 to 15 show the structure for attaching the code plate onto the guide rail, in which FIG. 13 is a fragmentary sectional view of relevant portions.

FIG. 14 is a reduced sectional view across line A—A of FIG. 13.

FIG. 15 is a bottom view of the structure illustrated in FIG. 13.

FIG. 16 is a side elevational view showing a variation of the train.

FIG. 17 is a top view of the same train.

DESCRIPTION OF EMBODIMENTS

Figure 3:
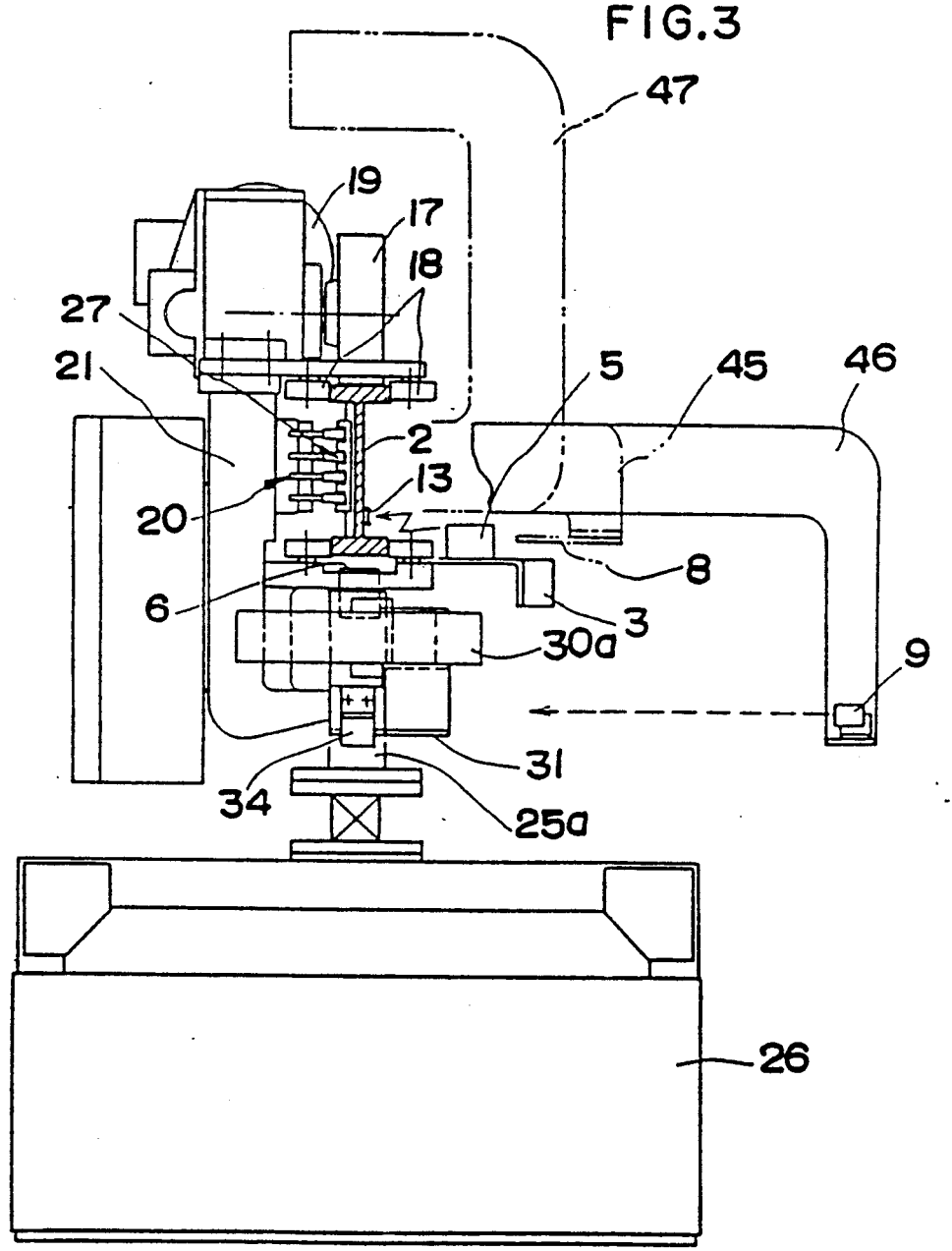
FIG. 3 is an end elevational view, partly in longitudinal section, of the system of FIG. 2.

In FIG. 1, 1 is a train travelling along the guide rail 2 and having a target detector 3, such as a proximity switch, a photo-electric receiver 4 to cancel stopping, a transmitter 5 to transmit information such as emergency stop, and a speed-change code reading means 6. A stopping station 7, prepared on the travelling rail, is provided with a stop target plate 8, a photo-electric switch projector 9 to cancel stopping, a low-speed instruction code plate 10, and a middle-speed instruction code plate 11. A high-speed instruction code plate 12 is arranged right after said station 7.

The guide rail is divided by each length that can be viewed at a glance by the workers without being bothered by any obstacles, around 10 to 30m for example. A radio signal-receiving antenna 13 (parallel line feeder for T.V. as an example) is laid along the guide rail 2 in each zone. A receiver 14, provided to receive signals transmitted from said transmitter 5, is connected to each antenna 13, and a sequence 16 is provided to identify train information by each zone from signals received by each receiver 14 and to indicate the information on a display means 15.

As shown in FIG. 2 and FIG. 3, the monorail train 1 comprises a driving wheel 17, anti-vibration guide rollers 18, a drive motor 19, and a driving trolley 21 having a current collector 20. Spaced from the driving trolley 21 is a driven trolley 24 (FIG. 2) having a driven wheel 22 and anti-vibration guide rollers 23. A connecting member 25 joins both trolleys 21,24, and a car 26 is hung from the connecting member 25. The guide rail 2 is of I-section, and a power supply rail 27 is laid on one side of the guide rail.

Both trolleys 21,24 are connected in such a manner that they can pivot around a vertical bearing shaft 28 (see FIG. 4), relative to bearing members 25a, 25b which are attached to the front and rear ends of the connecting member 25. Bumpers 30a, 30b are attached to both bearing members 25a, 25b, with supporting members 29a, 29b in-between, so as to be projected forward and backward respectively from the trolleys 21,24.

Figure 4:
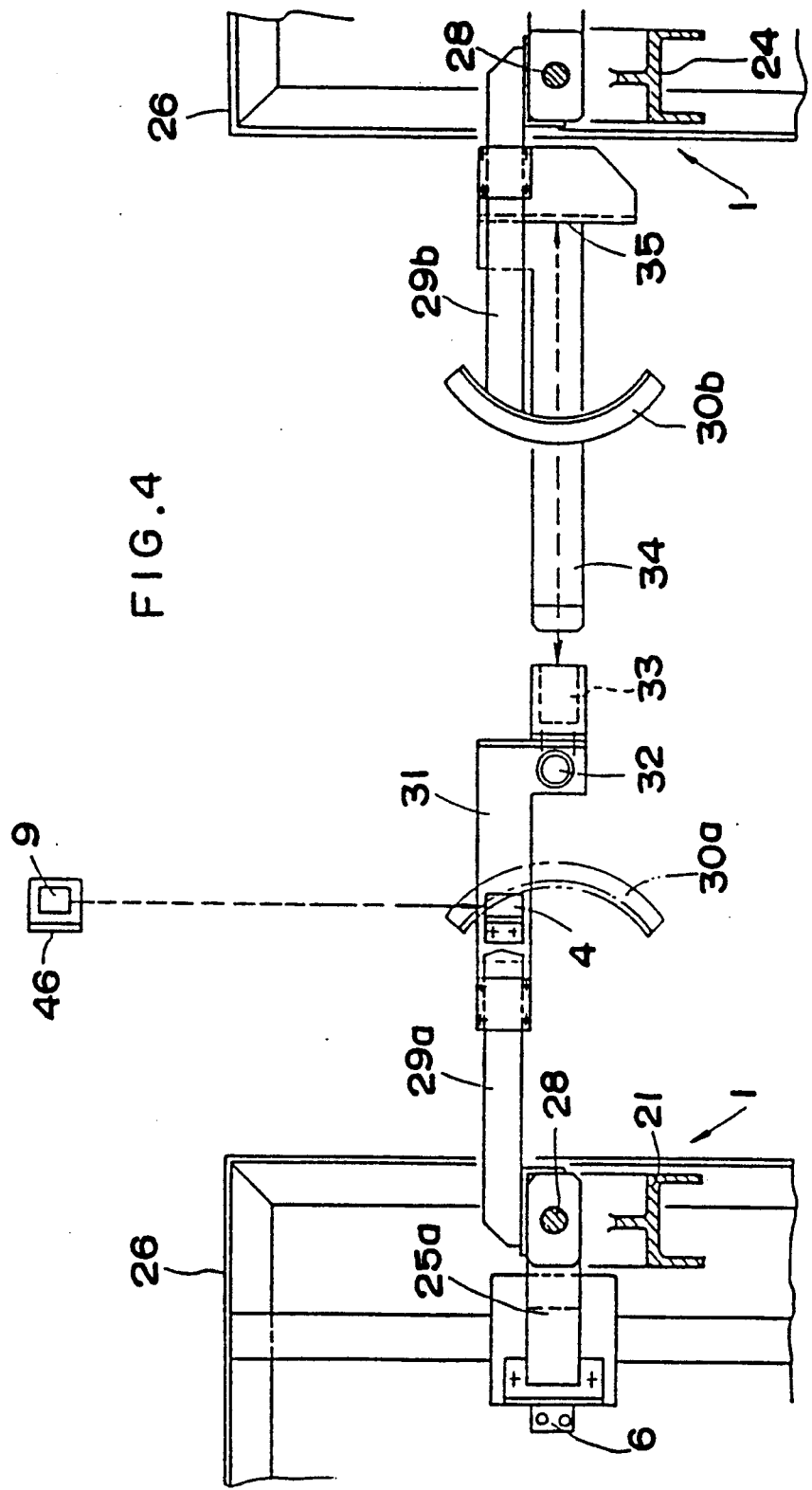

As shown in FIG. 2 and FIG. 4, a forwardly extending bracket 31 is attached to the front bumper supporting member 29a. The photo-switch receiver 4, a collision preventive proximity switch 32, and a collision preventive reflection type photo-switch 33 are attached to the bracket 31. A control plate 34 for collision prevention is attached to the rear bumper supporting member 29b. When two transporting trains travelling one behind the other close to within certain minimum distance, the control plate 34 is detected by the proximity switch 32 of the following train.

A vertical reflection face 35 is mounted at the base of the control plate 34 so that the reflection type photo-switch 33 of the following train can be actuated before the control plate 34 is detected by the proximity switch 32.

The detector for stopping 3 and the information transmitter 5 are attached to a bracket 36 extending laterally from the driving trolley 21 as shown in FIG. 3 and FIG. 5.

The antenna 13 is laid onto the guide rail 2, on the side opposite to the power supply rail 27. To be more specific, the antenna is housed in a groove shaped casing 38, of a type suitable for telephone line laying, attached to a side of the guide rail 2 with adhesive tape 37, as shown in FIG. 6.

The speed change code reading means 6 is attached to the upper end of a bracket 39 mounted near the front of the connecting member 25 so as to be positioned directly under the guide rail 2, as shown in FIGS. 2 and 5. As shown in FIG. 6 and FIG. 7, each of the code plates 10-12 to be read by this code reading means 6 comprises, a base plate 40 which contacts the lower face of said guide rail 2. A nut plate 42 is fitted into an internal groove 41 which extends longitudinally on the lower side of the guide rail 2, and a bolt 43 fastens the base plate 40 to the nut plate 42. The position of the base plate 40 on the guide rail 2 can be adjusted freely in the longitudinal direction by loosening the bolt 43. A guide flange 40a is formed on the base plate 40. The flange contacts a side of the guide rail 2 and orients the plate properly relative to the rail.

Two indicators are arranged in parallel at the bottom of the base plate 40, along both sides, and specific indicators 44a, 44b are formed by selectively attaching magnetic rubber strips onto each indicator, parallel to longitudinal direction of the rail. In the example of FIG. 1, the low-speed instruction code plate 10 has a specific indicator strip 44a only at the right side of the base plate 40, the middle-speed instruction code plate 11 has a specific indicator strip 44b only at the left side of the base plate 40, and the high-speed instruction code plate 12 has specific indicator strips 44a, 44b at both left and right sides of the base plate 40.

The speed change code reading means 6 has a pair of magnetic proximity switches 6a, 6b to separately detect the indicators at the right and left sides of the code plates 10-12 as shown in FIG. 6. These proximity switches 6a, 6b are turned to ON only when the indicators of the code plates 10-12 include said specific indicator strips 44a, 44b.

As shown in FIG. 3, the target plate for stopping 8 and the photo-switch projector 9 to cancel stopping are respectively attached to the guide rail 2 by means of brackets 45, 46 (FIG. 3). A structural bracket 47 is provided for supporting the guide rail 2.

Figure 8:
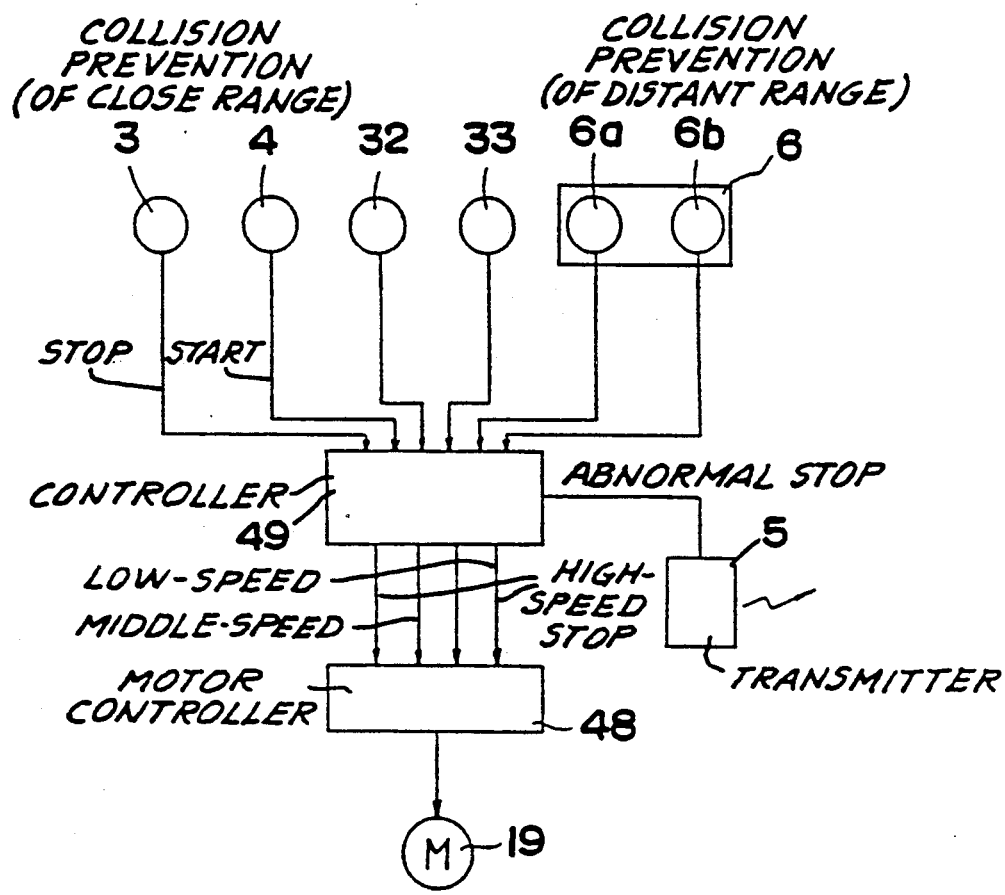
FIG. 8 is a diagramatic block drawing to explain the control system.

As shown in FIG. 8, the train 1 is equipped with the photo-switch receiver 4 to cancel stopping, the proximity switch 32 for collision prevention, the reflection type photo-switch 33 for collision prevention, and a controller (sequencer or micro computer, etc.) 49 to control the motor 19 thorough a motor controller 48, or to control the transmitter 5 according to signals detected by the respective magnetic proximity switches 6a, 6b.

Figure 9:
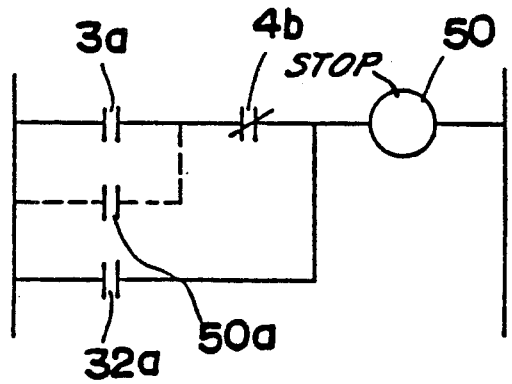
FIG. 9 is a partial circuit diagram showing stop control conditions.

FIG. 9 is a circuit diagram to show the condition under which the controller 49 gives a stop instruction to the motor controller 48. A normally open contact 3a of the stop detector 3 and a normally closed contact 4b of the photo-switch receiver 4 for cancelling the stop instruction, are connected in series with a magnetic stopping relay 50. A normally open contact 32a of the collision-preventing proximity switch 32 is connected in parallel with the normally open contact 3a and normally closed contact 4b. It is also possible to connect a self-holding contact 50a of said magnetic stopping relay 50 in parallel with the normally closed contact 3a so that the train 1 can be stopped even under an over-run state in which the stop detector 3 goes beyond the stop target plate 8. When the magnetic stop relay 50 is energized, a stop instruction is given to the motor controller 48.

In the above-described embodiment, the motor 19 is operated by power supplied from the power supply rail 27 through the current collector 20 and the motor controller 48. The driving wheel 17 is thereby driven to run the train 1 along the guide rail 2. When the train 1 reaches the station 7, the middle-speed instruction code plate 11 is first read by the speed change code reading means 6. From the resulting ON/OFF state of the magnetic proximity switches 6a, 6b, the controller 49 judges the instruction to call for deceleration to middle speed and gives an output of middle-speed instruction to the motor controller 48. When the train 1 is travelling at middle-speed, the code plate 10 for reduction to low-speed is read, and low-speed instruction is given to the motor controller 48. The travelling speed of the transporting train 1 is thereupon reduced to low-speed.

When the stop detector 3 detects the target place 8, the magnetic stop relay 50 shown in FIG. 9 is energized. A stop instruction is thereupon given from the controller 49 to the motor controller 48 to stop the motor 19, and the train 1 comes to a stop at the station 7.

To start the train 1, the photo-switch projector 9 is energized and illuminated. The receiver 4 of the train 1 receives the light from the projector 9 to open the normally closed contact 4b shown in FIG. 9. The magnetic stop relay 50 is deenergized to cancel the stop instruction, and power supply to the motor 19 is re-established, and the train 1 starts. Since the projector 9 has a range of projection which can cover a whole range of positions larger than the detecting range of the target plate 8 by the stop detector 3, stop cancel instruction can be given to the train 1 even if the stopped position of the train 1 is forward or backward within the allowable stopping range.

To keep train 1 running without stopping at the station 7, the photo-switch projector 9 is energized and illuminated before the train 1 reaches the station. The photoelectric receiver 4 receives the light from the projector 9 before the target plate 8 is sensed by the stop detector 3. Accordingly, no stop instruction is given because the normally closed contact 46 is open, which prevents the stop relay 50 from being energized. In other words, the train 1 goes past the station 7 while continuing to run at low-speed. The photo-switch projector 9 is kept energized and emitting at least up to the point where the train 1 reaches the position in which the stop detector 3 goes out of range of the stop target plate.

When the train 1 leaves the station 7, the speed change code reader 6 reads the high-speed instruction code plate 12, and the controller 49 is caused to give a high-speed instruction to the motor controller 48. The train 1 is thereupon accelerated to high-speed travelling, and keeps high-speed travelling thereafter.

If the train 1 comes to a stop between stations, due to a trouble, for example, the controller 49 detects the stopped condition and gives an emergency stop signal to the transmitter 5. The emergency stop signal is received by the receiver 14, in the zone where the train is stopped, through the antenna 13 within that zone and then is transferred to the sequencer 16. The number of the zone where the emergency stop is taking place is determined by the sequencer 16, and the information is displayed on the indicator 15. The controlling person, therefore, can take necessary actions immediately by sending workers to the zone according to the information displayed on the indication means 15.

If a following train 1 comes closer than a fixed distance to a train 1 stopped due to a trouble or to trains 1 stopped on a storage line, the photo-switch 33 of the following train 1 detects the reflector 35 of the preceding train at halt 1. The controller 49 thereupon gives an output of low-speed instruction to the motor controller 48, and said following train 1 is changed to low-speed travelling. When the following train 1 comes even closer to the preceding train, the proximity switch 32 of the following train detects the control plate 34 of the preceding train at halt. The controller 49 thereupon gives a stop instruction to the motor 10 controller 48 and the following train stops automatically before it collides with the preceding train.

The travel control system according to this invention, which uses the target plate 8 for stopping and the photo-switch projector 9 to cancel stop instructions, is also applicable to the entrance of a stopped train's monitoring zone, where it is necessary to stop any following trains without allowing them to come into the zone if any preceding train is stopped at a curve, junction, or joint of the rail. In the above embodiment, the photo-switch projector 9 and photo-switch receiver are to cancel stop instruction, but other arrangements may also be possible. For example, it is also possible to provide a bar magnet (not shown), having a required length in the train-travelling direction, in place of the photo-switch projector 9, and to mount onto the train 1 a magnetic sensor (not shown) which detects the magnetic force generated when the bar magnet is energized. Like the case where the photo-switch projector 9 and the receiver 4 are used, the bar magnet and the magnetic sensor must have a signal receiving range that can cover the range from before the beginning to after the end of the detecting range of the target plate 8 by the stop detector 3. As a method, it is also possible to lay a plurality of magnetic sensors in parallel to the travelling direction of the trains, instead of using a magnet of bar form, so that the required range can be covered A more specific description of how the speed change information of the code plates 10-12 is read by the speed change code reading means 6 and the controller 49 now appears in the following text:

As shown in the flow chart of FIG. 10, the controller 49 of train is constantly reading and testing the activated/non-activated condition of the proximity switch detectors 6a, 6b. In the sequence of testing, it tests first to determine if the low speed proximity switch 6a has been activated (first diamond box 100). If the switch 6a is activated, a flag is set in the memory function of the controller 49 (first rectangular box 101). If the low speed switch is not activated, the low speed flag is not set, and the middle speed activator 6b is tested (second diamond box 102). If the middle speed proximity switch is "on", a flag, representing that fact, is et in the memory function of the controller (second rectangular box 103).

In the event the middle speed flag is set, the system next tests each of the proximity switches 6a, 6b (diamond boxes 104, 105) to determine if either is activated; if either switch is activated, the system branches via lines 106, 107 to the return function 108 and recycles. During any recycling of the control system, any flag previously set remains set. Accordingly, on a second cycling, for example, where the middle speed flag was previously set on the first cycle, the low speed switch 6a is again tested at 100. If, on this cycle, the low speed switch has been activated, the low speed flag is set at 101. This flag will remain set until the control cycle has been ended and the memory flags reset, as will be described.

In any cycle, if the middle speed switch 6a tests to be deactivated at 103, the system branches out at 108, where it tests for previous setting of the low speed flag, at 109, and conditionally for previous setting of the middle speed flag, at 110. If either flag is set, the system branches back through 111 to the main system for further testing. If no flag is set, it branches through 107 to the return function and continues to recycle.

Assuming one or both of the speed flags have been set, the low speed and middle speed proximity sensor 6a and 6b eventually will both test as deactivated, when the train has completely passed the target plate, and the proximity switches are no longer in proximity to the magnetic code strips. At this stage, the system will direct control via 112, which commences the final reading of the speed control information and its application to the train. First, the low speed flag is tested for its set/reset condition at 113. If the low speed flag set, control passes through 114 to 115, where the set/reset condition of the middle speed flag is tested at 115. If the middle speed flag is not set, that means that only the low speed instruction was obtained at the code plate, and the low speed control is set actuated at 116.

If the middle speed flag tests as being set, at 115, that means that both the low speed and the middle speed flags were set as the detector elements passed over the code plate. Accordingly, the high speed control 117 is actuated.

If, at 113, the low speed flag tests as rest, the system branches to 118 to activate a middle speed control 119. There can be an intermediate test at 120 for the condition of the middle speed flag although it is generally redundant, as at least one of the flags should be set in order for the control to branch to the final evaluation at 112.

After setting one of the speed control elements 116, 117 or 119, the system branches to the reset control 121, in which all of the memory flags are reset, and control goes to the return function for continued recycling. No further controls will be implemented during continued recycling of the system until the proximity switches 6a, 6b approach the next code plate.

In a typical sequence, the train approaching a stopping point will first pass a code plate providing instructions for reducing to intermediate speed. This is followed shortly by passing a second code plate giving instructions for low speed. This is in turn is followed by entering the control range of the stop target plate 8. If the stop instructions have not been cancelled or overridden by the projector 9, the train will stop. However, if the stop circuit is effectively cancelled by operation of the projector, the train will continue on through the stopping point at low speed, until it comes to a further code plate containing instructions for high speed operation.

Because the control system of the invention sets a memory flag for each instruction code sensed by the proximity switches 6a, 6b, and does not act on the instructions represented by such emory flags until both proximity switches have been deactivated, the control system can tolerate considerable inaccuracy in the relative alignment of adjacent control strips. For example, control information, such as high speed instruction, can be read accurately without any trouble, even if the top end or tail end position of each specific indicator 44a, 44b is offset in the travelling direction, as illustrated in FIG. 11. In other words, positional error is acceptable in the length of the rubber magnet strips or in their mounting onto the base plate 40. It is also allowable for the code plate 12 to be tilted to the right or left in the travelling direction when it is attached to the guide rail.

It is also possible to construct the code plates 1012 by using the surface of the guide rail 2 as the base plate 40, and by attaching magnetic rubber strips 44a, 44b directly onto the guide rail 2 as the specific indicators on the code plates 10 to 12. By changing the reading method or the attaching position, however, it is also possible to construct the specific indicators using colored tape, light reflecting tape, or magnetic plates. The base plate 40 can also be colored directly.

In the above described embodiment, three kinds of code plates 10 to 12 are utilized, providing low speed, medium speed, and high speed operation. It is also possible to apply this invention in such a way that the code plates provide an address to each station, junction, or joint. Where the control information includes address information or the like, three or more indicators are arranged in parallel on the code plate.

Figure 12:
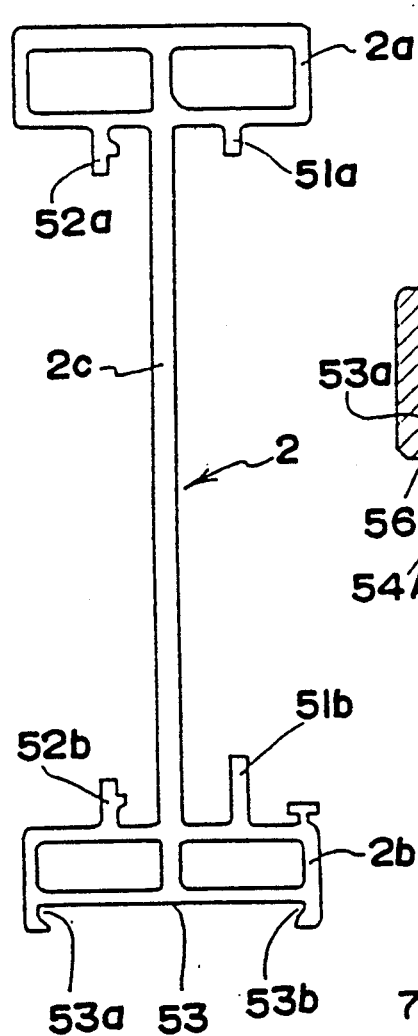
FIG. 12 is an end elevational view showing a specific structure of the guide rail.

Referring now to FIG. 12 to FIG. 15, there are shown specific details of composition of the guide rail 2, and the structure for attaching various kinds of control code plates onto the guide rail 2. As shown in FIG. 12, the guide rail 2 is an integrated unit comprising an upper flange 2a, a lower flange 2b, and a vertical web section 2c at the center, forming an I-shaped longitudinal beam section. A pair of upper and lower projections 51a, 51b are provided for attaching the rail-supporting bracket 47, shown by an imaginary line in FIG. 3. A pair of upper and lower stepped projections 52a, 52b are provided to attach the current collecting rail 27, shown in FIG. 2 and FIG. 3.

Under the lower flange 2b, a groove 53, covering almost the whole width of the lower rail 2b is formed along the whole length, and concave grooves 53a, 53b are formed along the whole length at both right and left sides of said groove 53. A control code plate 55 is received in the groove 53 and is adjusted to a desired position in a length-wise direction of the guide rail 2. The code plate 55 is made of non-magnetic strip such as aluminum. On one of the two sides, parallel to length-wise direction, an L-shaped projection 56 is provided, which fits into the corresponding concave locking groove 53a along the whole length of the code plate. On the other side, locking tongues 57 of inverted U-shape are provided at several positions in the length-wise direction. These fit into corresponding concave locking grooves 53b, by elastic deformation.

At both ends of the code plate 55 are attaching plates 58, of L-shape, which come in contact with the bottom 53c of the groove 53. Attaching holes 59 are provided on each of the attaching plate 58. Magnetic strip positioning ribs 60, 61 project from the bottom face of the code plate 55, and strip receiving grooves 62A-62C are formed by these ribs. Magnetic strips 54A to 54C are received in each of the strip-receiving grooves 62A to 62C for mounting magnetic strips in different combinations.

In the drawing, magnetic strips 54A to 54C are attached to all three grooves 62A to 62C of one code plate 55. Actually, however, one or more strips may be utilized, according to the requirements of the control. For example, the control may provide for high-speed/low-speed switching, low-speed/stop switching, low-speed to high-speed switching, etc.

Figure 13:
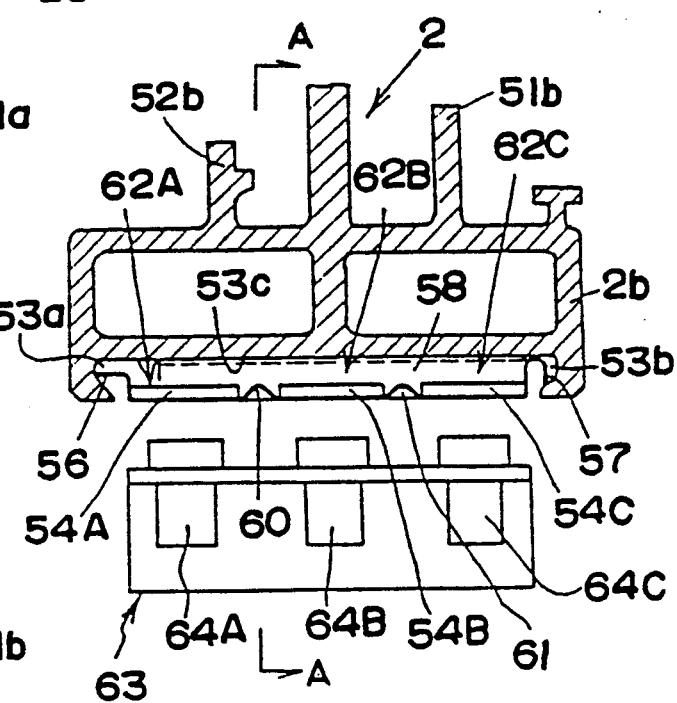

The detector element 63 is attached to the train so as to be located right under the lower rail 2b of said guide rail 2, as shown in FIG. 13. This detector 63 comprises three magnetic sensors 64A to 64C respectively, corresponding to each of the band areas for mounting magnetic strips, 62A to 62C on the code plate 55.

The code plate 55 is attached to the guide rail 2 in the following manner: First at a pre-determined position for attaching, the L-shaped projection 56 of the code plate is fitted into one of the concave edge grooves 53a of the recess 3. Then, the locking tongue 57 of the code plate is pushed up and fitted into the other concave locking groove 53b while resiliently deforming the tongue 57. Under this state, the code plate 55 can be slid in the length-wise direction of the guide rail 2. After making sure, by test operation if necessary, that the code plate 55 is properly positioned, the attaching plates 58 are fixed onto the groove bottom 53 using screws.

The train 1 ca be automatically controlled at each control position by attaching the code plate 55 to the control positions set along the travelling rail as explained above. In other words, the magnetic sensors 64A to 64C of the detector 63 detect the magnetic strips 54A to 54C without coming into contact when the transporting train 1 goes through the control position, and travel control corresponding to the detected signal is automatically practiced.

The code plate 55, having only the magnetic strip 54A attached thereto, for example, can be used as a low-speed instruction code plate 10 shown in FIG. 1. With only the magnetic strip 54C attached the code plate 55 can be used as a middle speed instruction code plate 11, as shown in FIG. 1. With both of the magnetic strips 54A, 54C attached the code plate can be used as a high-speed instruction code plate 12, as shown in FIG. 1. The magnetic sensor 64B is not necessary if the code plate is used in such a manner.

In the last described embodiment, the code plate 55 is shown with magnetic strips 54A to 54C corresponding to the control codes. Indication of control code on the code plate, however, is not limited to magnetic strips. For example, the code plate can be provided with a light shielding plate or a limit switch kick-off plate attached according to the type of the detector carried by the train.

Figure 18:
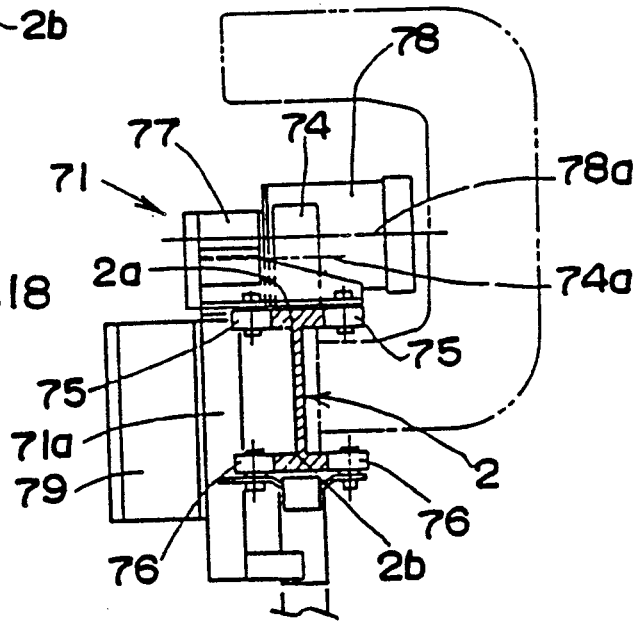
FIG. 18 is a partial longitudinal section of the same train.

Referring now to FIGS. 16-18, a variation of the train is described below. The train 70 is composed of a driving trolley 71, a driven trolley 72, and a connecting member 73 which connects both trolleys under the guide rail 2, all basically the same as for the train 1 shown in FIGS. 2 and 3. The driving trolley 71 comprises the trolley proper 71a, a driving wheel 74 riding on the upper flange 2a of the guide rail 2, and anti-vibration rollers 75,76 engaging opposite sides of the upper and lower rail flanges 2a,2b. A driving motor 78 drives the wheel 74 through a reduction gear 77.

A control box 79 is mounted at the side of the trolley 71. A collision-avoidance proximity switch 81 attached to the leading end of a bracket 80, which extends forward from the front trolley 71. The proximity switch 81 corresponds to the collision preventive proximity switch 32 of the train. A current collector 83 is arranged for contact with the power supply, and, a control signal receiving group 82 is laid on one side of the guide rail 2.

The driven trolley 72 comprises a wheel 84, turning on the upper rail flange 2a, anti-vibration rollers 85,86 which straddle the upper and lower rail flanges 2a,2b. A collision-prevention plate 87 extends rearward and is adapted to be detected by the anti-collision proximity switch 81 of a following train. The plate 87 corresponds to the plate 34 of the first-described train.

The reduction gear 77 attached to the driving trolley 71 is mounted on the upper end of the trolley proper 71a, which is positioned on one side of said guide rail 2, and is arranged in such a manner as to extend backward from the trolley. The driving wheel 74 is mounted at a side of and near the front end of the reduction gear 77. The drive motor 78 is attached in horizontal orientation and mounted on the same side of the reduction gear has the driving wheel 74 near the back of the reduction gear In the train shown in FIGS. 2 and 3, the motor 19 is attached in a way that the axis of the driving wheel 17 is at right angles to the axis of the motor. In the embodiment of FIGS. 16-18 the reduction gear 77 is arranged at one side of said driving wheel 74, so as to be kept parallel with the guide rail 2, and the motor 78 is attached to the same side of the reduction gear as said driving wheel 74, so that the axis of said driving wheel 74 is kept parallel to the axis of the motor. With the monorail type train 70 compossed as described above, the motor 78 is driven according to the control signal and by the power supplied from the power 15 supply and signal receiving rail group 82 through the current collector 83 in the same manner as the train 1 in the earlier embodiment. Rotary power of the motor 78 is transferred to the driving wheel 74 through the reduction gear 77, and the train 70 travels along the guide rail 2 when said driving wheel 74 turns.

This invention can be embodied as described above, and the features and effects are as follows:

(1) In the embodiment shown in FIGS. 1 to 9, a train can be stopped at the position of the stop target plate 8; or allowed to pass through, by ON/OFF control setting of an ON/OFF signal transmitter, such as the photoswitch projector 9 or a magnet, for example. A separate actuator device is not required to change position of the stop target plate 8 nor are any limit switches required to check switching position. This reduces the number of parts required and makes embodiment less expensive.

(2) Moreover, the train is stopped at the stop position without fail when the stop target plate 8 is sensed by the detector for stopping 3 even if the ON/OFF signal transmitter goes out of order. Accordingly, there is no risk of accident caused by the train going past the stop position.

(3) If the specific control indicators 44a, 44b were so composed that control information were judged according to the prior art, simply from the ON/OFF state of each detector, without memorizing the ON operation of the detecting detectors (proximity switches 6a, 6b, the control information contained on the code plate which is read cannot be judged exactly because two or more detectors, corresponding to a plurality of specific control indicators, are not turned ON simultaneously unless the leading end position of each specific control indicator 44a, 44b is accurately positioned on a straight line crossing at right angles with the travel ling direction, and each detector is also placed accurately in parallel on a straight line at right angles with the travelling direction. For this reason, with prior art systems, another timing indicator and a detector to detect the timing are provided to delay slightly the reading of control information. By the control method according to this invention as shown in FIG. 10, however, two or more specific control indicators are provided on the code plate, and control information contained in the code plate can be read exactly, even if the leading or rear end positions or these specific control indicators are offpositioned in travelling direction, as shown in FIG. 11. This is made possible because ON operation of the detector detecting the specific indicators is memorized by setting of a flag as described above, and control information is judged from the memorized ON condition after all the detectors have been turned OFF. Accordingly, control information held by the code plate can be read exactly even if no timing indicators nor any timing detectors are used, and travel control of trains can be practiced accurately. This means that width of the code plate and of the reading means can be reduced, which makes number of parts less and reduces the cost.

(4) The specific control indicators of the code plate do not require very high positional accuracy, and the specific indicators on the code plate can be composed easily by attaching rubber magnetic strips as shown in the embodiments and the code plate can also be attached easily.

(5) The position of the member to be detected for control can be adjusted very easily in a length-wise direction. In the embodiment of FIGS. 1-9, the code plate is secured by a slidable bolt and nut arrangement 43, 42. In the embodiment of FIGS. 12-15, the code plate can be mounted in a groove 53 formed on the lower face of the guide rail in such a manner that the plate can be moved in length-wise direction of the guide rail and under such condition that the plate does not drop even if it is released during fitting.

(6) The code plate can be attached easily and at a high accuracy as the code plate temporarily mounted and adjusted on the guide rail is simply fixed with a screw as required. The position of the code plate can also be changed very easily.

(7) Code plates having various kinds of control codes can be composed easily and at a low cost by attaching magnetic strips to a non-magnetic base to comprise the code plates.

(8) Such troubles as unexpected peeling of the magnetic strips by some other objects coming in contact therewith can be prevented when the magnet tape is attached to the bottom face of the guide rail, i.e. the back side of the non-magnetic base. In addition, there will be no such trouble of dripping of peeled magnetic strips, even when adhesive strength is lowered by aging.

(9) In the embodiment shown in FIG. 16 to FIG. 18, the length of the motor 78 is long enough, compared with widths of the driving wheel 74, that the motor 78 is projected to the opposite side of the reduction gear 77 from the guide rail 2, in plan view. Moreover, the motor 78 is heavy, and the motor can be attached so that the center of gravity of the whole driving trolley is placed onto the center line of the guide rail or closer to the center line compared with the case where the motor 78 is attached to the rear end of the reduction gear 77, aligned in a forward - backward direction. In other words, the weight balance of the whole driving trolley in a lateral direction is improved, and no substantial unbalanced weight is applied to the driving trolley, which serves to avoid uneven wear of the anti-vibration rollers 75, 76.

(10) Since the rotary axis 78a of the motor 78 is parallel to the rotary axis 74a of the driving wheel 74, the transmission gear of the reduction gear 77 placed between the two axies is not limited, and the reduction gear can be composed inexpensively by using spur gears and others.

What is claimed is:

1. A system to control travel of trains running along a travelling rail, which comprises
   (a) a stop target provided at each stop position along said rail,
   (b) a stop sensing device carried by said train for detecting said stop targets,
   (c) control means for stopping the train in response to the sensing of a stop target, and
   (d) override means for overriding said control means, to prevent stopping of the train upon detection of a stop target,
   (e) said override means comprising an override sensor carried by said train and a controllable signal transmitter located at a stop position, said override sensor becoming activated before the detection of a stop target by said stop sensing device,
   (f) said controllable signal transmitter and said override sensor having an effective transmission-receiving range which is greater in the direction of train travel than an effective range in said direction of said stop target and said stop sensor.

2. A system to control travel of trains according to claim 1, wherein
   (a) said controllable signal transmitter comprises a photo switch projector, and,
   (b) said override sensor comprises a photo switch receiver.

3. A system to control travel of transporting trains according to claim 1, in which
   (a) said controllable signal transmitter comprises a magnetic device, and
   (b) said override sensor comprises a magnetic sensor.

* * * * *